Nov. 23, 1954 J. A. McBRIDE 2,695,316
CATALYTIC PREPARATION OF POLYSULFIDES FROM ALKYL SULFIDES
Filed Dec. 19, 1949
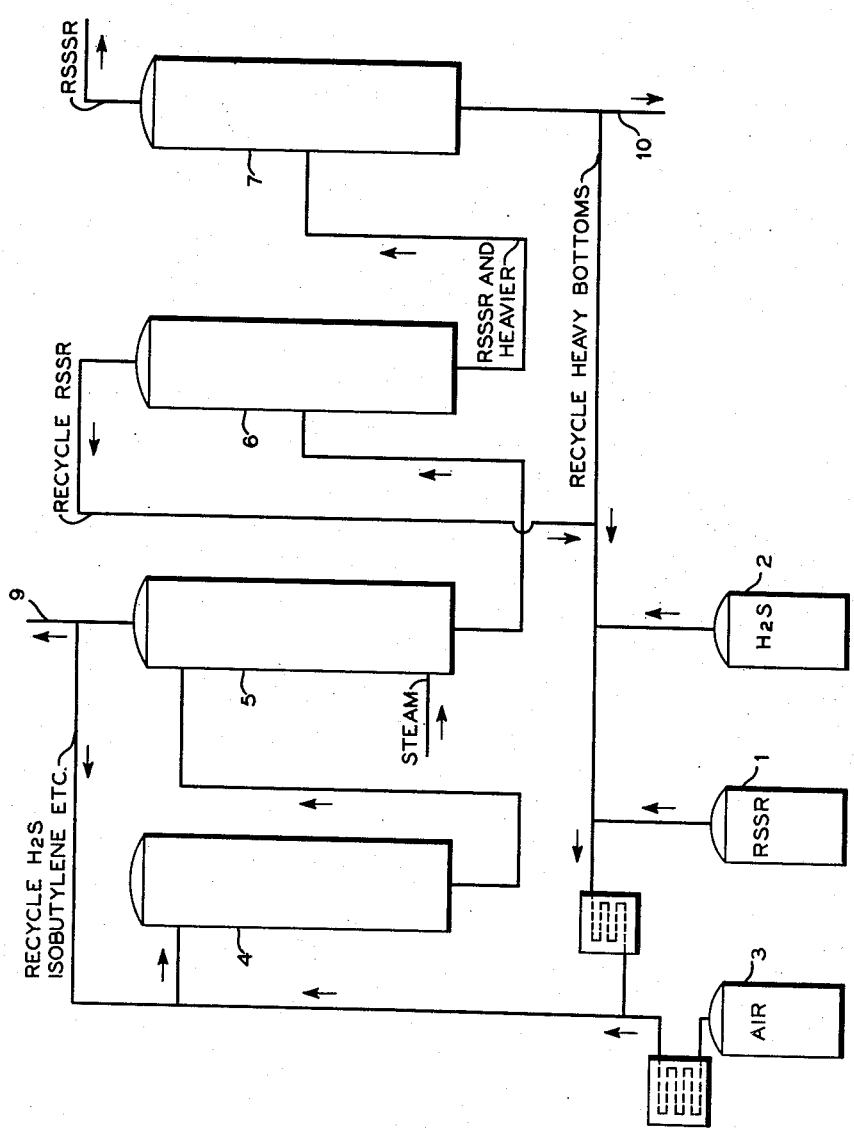
INVENTOR.
J. A. McBRIDE
BY
Hudson and Young
ATTORNEYS

2,695,316

CATALYTIC PREPARATION OF POLYSULFIDES FROM ALKYL SULFIDES

John A. McBride, Phillips, Tex., assignor to Phillips Petroleum Company, a corporation of Delaware Application December 19, 1949, Serial No. 133,915

15 Claims. (Cl. 260—608)

This invention relates to the preparation of an organic sulfide, more particularly an organic polysulfide. In one of its aspects it relates to the conversion of an organic disulfide to a corresponding polysulfide, especially the trisulfide. In another of its aspects the invention relates to the preparation of di-tertiary butyl trisulfide from di-tertiary butyl disulfide and sulfur. In still another of its aspects the invention relates to the preparation of a di-tertiary butyl polysulfide from tertiary butyl disulfide and sulfur. In one of its embodiments the invention relates to the preparation of a di-tertiary butyl polysulfide from di-tertiary butyl disulfide and hydrogen sulfide in the presence of a solid catalyst adapted to cause the sulfur of the hydrogen sulfide to be transferred in situ to the tertiary butyl disulfide under conditions set forth herein.

It appears that certain polysulfides, for example, tertiary butyl polysulfides, can be useful in the preparation of lubricating oils, in the flotation of ores and in other fields. Accordingly, a simple and economical process for their preparation has been highly desired. A prior art process which has been proposed involves the interaction of a tertiary butyl mercaptan with elemental sulfur in the presence of butylamine (liquid boiling point 187° C.). Still another prior art process involves the reaction of tertiary butyl disulfide with liquid sulfur in the presence of di-amylamine (liquid boiling point 78° C.). There is also disclosed in the prior art a reaction of a disulfide with sulfur in the presence of ammonia.

It has now been found that an organic sulfide, for example, a disulfide such as di-tertiary butyl disulfide, can be readily and economically converted to a sulfide containing at least one additional sulfur atom, for example di-tertiary butyl trisulfide, by subjecting said disulfide together with sulfur to the action of a suitable solid catalyst, preferably of the bauxite type. Also, as a particular feature of the invention, it has been found that hydrogen sulfide, which is readily and cheaply available in the petroleum refinery as an undesirable by-product, can be used as the source of the sulfur and for supplying said sulfur in situ by passing it together with air and the compound to which sulfur is to be added over a suitable solid catalyst, preferably of the bauxite type. The reaction using hydrogen sulfide appears to be exothermic and, therefore, a saving of heat, which cannot be accomplished by the prior art processes, which must supply externally the heat of fusion of the sulfur, appears to have been realized.

It is among the objects of this invention to provide a process for the preparation of an organic polysulfide, for example, di-tertiary butyl trisulfide.

Also, among the objects of the invention is to provide a process for the conversion of di-tertiary butyl disulfide to a di-tertiary butyl polysulfide, for example, di-tertiary butyl trisulfide.

Further among the objects of the invention is to provide a process for the catalytic preparation of an organic polysulfide, for example, a ditertiary butyl polysulfide such as di-tertiary butyl trisulfide.

Still further, it is among the objects of this invention to set forth a process for the preparation of an organic polysulfide using hydrogen sulfide as a source of sulfur produced in situ.

Other objects as well as advantages of the invention are apparent from this disclosure, the appended claims and the drawing.

According to the invention an organic disulfide such as di-tertiary butyl disulfide is caused to interact with sulfur in the presence of a suitable solid catalyst, preferably of the bauxite type. Also, according to the invention the sulfur can be furnished economically during the reaction, that is, in situ, by passing the organic disulfide over the catalyst together with a compound, which will release sulfur under the conditions of the reaction, for example, hydrogen sulfide.

To more fully set forth the invention reference will be made to the drawing which illustrates diagrammatically a flow plan of an embodiment of the invention. Di-tertiary butyl disulfide from source 1, hydrogen sulfide from source 2 and air from source 3 are admixed and passed to catalyst zone 4 wherein conversion of the disulfide, to the corresponding trisulfide and some higher sulfides, is effected. From zone 4 the reaction effluent is stripped with steam in zone 5. Unreacted hydrogen sulfide, isobutene and other vaporous materials stripped from the reaction effluent are removed overhead. A portion of this overhead stream is continuously removed via line 9, in order to prevent the accumulation of nitrogen in the system. The remainder of the overhead stream from zone 5 is recycled to zone 4. Bottoms from the steam stripping zone, including any unreacted disulfide, the desired trisulfide and heavier are fractionated in vacuum fractionation zone 6 to separate overhead any unreacted disulfide which can be recycled to the catalyst zone. Bottoms from zone 6 are then fractionated in vacuum fractionation zone 7 to separate overhead the trisulfide. Bottoms from zone 7 can be recycled to the catalyst zone for conversion to trisulfide, or removed from the system via line 10.

As stated, sulfur itself may be used in the reaction of the invention. However, it is considered highly advantageous to make use of hydrogen sulfide which is readily and cheaply available in the oil refinery in which the products of this invention find at least one use and for this reason can be advantageously made there from materials there available.

To properly effect the reaction of the invention enough oxygen containing medium, such as air, should be available in the catalyst zone to oxidize the hydrogen sulfide.

The ratio of hydrogen sulfide to the disulfide should be, preferably, in the range 2:1 to 4:1, although some product can be obtained without this range.

The temperature at which the reaction is effected should be within the range of from about 250–500° F., preferably 250°–400° F., and more preferably in the range 300°–350° F. This is the catalyst zone temperature. It is advantageous to preheat the hydrogen sulfide, air and disulfide mixture to about 250°–300° F. before passing it to the catalyst zone.

Although the reaction can be effected at ordinary or atmospheric pressure the process should be operated at an elevated pressure, for example, 200 to 800 pounds per square inch gage, or higher, though a pressure range of 200 to 500 pounds per square inch is now preferred, to inhibit the decomposition of the disulfide.

As stated, other disulfides may be used as starting material according to the invention. For example there may be used diemthyl disulfide ($CH_3SSCH_3$), diethyl disulfide ($C_2H_5SSC_2H_5$), diisopropyl disulfide, di-n-propyl disulfide ($C_3H_7SSC_3H_7$), di-n-butyl disulfide, di-n-amyl disulfide, di-tert.-amyl disulfide, etc.

As stated, a solid catalyst, preferably of the bauxite type, is employed. It can be a native hydrous aluminum oxide which at room temperature contains varying amounts of hydrous aluminum oxide (e. g., $Al_2O_3.2H_2O$), hydrous ferric oxide ($Fe_2O_3.nH_2O$), silica ($SiO_2$), and titania ($TiO_2$), and which grades into the minerals diaspore and gibbsite. Samples of bauxite useful in the process of my invention may contain: from about 30% to about 80% $Al_2O_3$; from about 8% to about 30% $H_2O$; from about 0.1% to about 50% $Fe_2O_3$; from about 1% to about 40% $SiO_2$; and from about 1.5% to about 4% $TiO_2$. Other metal oxide-containing catalysts which may be employed are vanadia, magnetic iron oxide and chromia.

The following is an example which illustrates the invention:

Tertiary butyl disulfide, hydrogen sulfide and air were passed over "Florite," an activated catalyst of the bauxite type. The procedure was as follows.

The disulfide and hydrogen sulfide were charged to a steel cylinder, and thoroughly mixed. The mixture was displaced from the cylinder with nitrogen, mixed with a measured quantity of air and passed through a preheater consisting of a section of ¼ inch pipe wrapped with a length of Glasohm wire (Glasohm wire is an electrical heating element consisting of a core of glass fiber wrapped with resistance wire and insulated with a braided glass fiber covering). From the preheater, the mixture passed into the top of the catalyst case, a 1 x 15 inch stainless steel vessel containing 215 ml. of 10–16 mesh Florite catalyst which had been activated 4 hours with nitrogen at 300° F. From the bottom of the catalyst vessel, the converted mixture passed through a spiral condenser and into a gas separator. The gas was vented to the atmosphere and was not measured. The condensed liquid was collected.

Reaction conditions:

Temperature, °F_____ 300–500 (approx. average).
Charge rate, lb./hr____ 0.492 (liquid charge only).
Charge rate, LV./V./hr 1.22.
Pressure_____ Atmospheric.

Material balance—
Charge:
Tertiary butyl disulfide,
lb_____ 3.841 (0.0216 moles)
Hydrogen sulfide, lb____ 1.328 (0.0415 moles)

Total, lb_____ 5.169
Recovery:
Liquid product, total lb_____ 3.035
Recovered disulfide, lb_____ 2.392
Disulfide converted, lb_____ 1.449
Tertiary butyl trisulfide, lb_____ 0.421
Conversion:
Weight per cent of disulfide charged_____ 37.8
Yield:
Tertiary butyl trisulfide, based on disulfide converted, weight per cent_____ 25.8

Reasonable variation and modification are possible within the scope of the foregoing disclosure and the appended claims to the invention the essence of which is believed to be in that a process for the conversion of a disulfide to a trisulfide in the presence of a suitable solid catalyst, preferably of the bauxite type, has been set forth and described.

I claim:

1. A process for introducing at least one additional sulfur atom into an alkyl sulfide which comprises the step of reacting said sulfide with sulfur in the presence of a bauxite catalyst at a temperature in the range 250 to 400° F.

2. A process for introducing at least one additional sulfur atom into an alkyl sulfide which comprises the step of reacting said sulfide with sulfur in the presence of a metal oxide-containing catalyst selected from the group consisting of bauxite, diaspore, gibbsite, titania, vanadia, hydrous ferric oxide, magnetic iron oxide and chromia at a temperature in the range 250 to 500° F.

3. The process of claim 2 wherein a bauxite catalyst is employed.

4. The process of claim 3 wherein the temperature during the reaction is maintained in the range 300 to 350° F. and wherein the pressure is maintained in the range 200 to 800 pounds per square inch gage.

5. A process for the preparation of an organic polysulfide which comprises heating an organic disulfide selected from the group consisting of dimethyl disulfide, diethyl disulfide, diisopropyl disulfide, di-n-propyl disulfide, di-n-butyl disulfide, di-n-amyl disulfide, di-tertiary-butyl disulfide and di-tert.-amyl disulfide with sulfur in the presence of a metal oxide-containing catalyst selected from the group consisting of bauxite, diaspore, gibbsite, titania, vanadia, hydroferric oxide, magnetic iron oxide and chromia at a temperature in the range 250° to 400° F. under a pressure in the range 200 to 800 pounds per square inch gage for a time sufficient to accomplish the desired extent of conversion.

6. A process for introducing at least one additional sulfur atom into a dialkyl disulfide which comprises the step of contacting said disulfide hydrogen sulfide and air with a bauxite catalyst at a temperature in the range 250 to 400° F.

7. A process according to claim 6 wherein the ratio of hydrogen sulfide to the disulfide is maintained within the range 2:1 to 4:1.

8. A process for introducing at least one additional sulfur atom into an organic sulfide, selected from the group consisting of dimethyl disulfide, diethyl disulfide, diisopropyl disulfide, di-n-propyl disulfide, di-n-butyl disulfide, di-n-amyl disulfide, di-tertiary-butyl disulfide and di-tert.-amyl disulfide, which comprises the step of contacting said sulfide with sulfur, provided in situ by using hydrogen sulfide and air, with a solid metal oxide-containing catalyst, selected from the group consisting of bauxite, diaspore, gibbsite, titania, vanadia, hydrous ferric oxide, magnetic iron oxide and chromia, at a temperature in the range 250° to 400° F. and under a pressure in the range 200 to 800 pounds per square inch gage for a time sufficient to accomplish a desired extent of conversion.

9. A process according to claim 8 wherein the ratio of hydrogen sulfide to the disulfide is maintained in the range 2:1 to 4:1.

10. A process for the conversion of di-tertiary-butyl disulfide to di-tertiary-butyl trisulfide which comprises the step of reacting said disulfide with sulfur in the presence of a bauxite catalyst at a temperature in the range of 250° to 400° F. at a pressure in the range 200 to 800 pounds per square inch gage for a time sufficient to accomplish a desired extent of conversion.

11. A process for the conversion of di-tertiary-butyl disulfide to di-tertiary-butyl trisulfide which comprises the step of reacting said disulfide with sulfur provided in situ by using hydrogen sulfide and air in the presence of a bauxite catalyst at a temperature in the range 250° to 400° F. at a pressure in the range 200 to 800 pounds per square inch gage for a time sufficient to accomplish a desired extent of conversion.

12. A process according to claim 11 wherein the ratio of hydrogen sulfide to said disulfide is maintained in the range 2:1 to 4:1.

13. The process of claim 11 in which the air is present in sufficient amount to oxidize substantially all of the hydrogen sulfide to sulfur and wherein the disulfide, the air and the hydrogen sulfide are preheated to a temperature in the range 250 to 300° F.

14. A process for producing a dialkyl polysulfide having at least three sulfur atoms per molecule from a dialkyl sulfide having at least two sulfur atoms per molecule, which process comprises reacting said dialkyl sulfide with sulfur in the presence of a bauxite catalyst at a reaction temperature in the range 250 to 400° F.

15. A process which comprises contacting a mixture of di-(tertiary butyl) disulfide, hydrogen sulfide and an oxygen-containing gas with a bauxite catalyst at a temperature in the range 300 to 500° F. and atmospheric pressure, the molar ratio of hydrogen sulfide to said disulfide being in the range 2:1 to 4:1 and the amount of oxygen being sufficient to oxidize a substantial part of said hydrogen sulfide to sulfur, and recovering a product polysulfide having more than two sulfur atoms per molecule.

References Cited in the file of this patent

UNITED STATES PATENTS

| Number | Name | Date |
|---|---|---|
| 2,527,948 | Lyon et al. | Oct. 31, 1950 |
| 2,529,355 | Schulze et al. | Nov. 7, 1950 |

OTHER REFERENCES

Mellor, "Modern Inorganic Chemistry," page 487, Longmans, Green and Co., New York, N. Y. (1925).

Ser. No. 362,376, Koppers (A. P. C.), published April 27, 1943.